United States Patent Office 3,467,601
Patented Sept. 16, 1969

3,467,601
COLORIMETRIC INDICATOR
Lothar W. Brauer, Berlin, Germany, assignor to Auergesellschaft G.m.b.H., Berlin, Germany, a corporation of Germany
No Drawing. Filed Aug. 3, 1965, Ser. No. 477,026
Claims priority, application Germany, Aug. 4, 1964, A 46,760
Int. Cl. G01n 31/22
U.S. Cl. 252—408    6 Claims

ABSTRACT OF THE DISCLOSURE

A colorimetric indicator for gas analysis of high reliability and uniformity in which a chemical reagent is carried on uniform crystals is made by crystallizing uniform crystals from aqueous solution, mixing the crystals with a solution of chemical reagent in a volatile solvent inert to the crystals, and removing the solvent.

This invention relates to colorimetric indicators for the detection or quantitative determination of gases, vapors, mists and the like, and more particularly to improved indicators in which the active colorimetric reagent is carried by a crystalline support material.

It is well-known to detect or quantitatively determine a great variety of gases, vapors or mists that are contained in air or other gases, by passing a sample of the gas to be tested through a transparent tube containing a bed of colorimetric indicator carried on a solid granular support material. The intensity of the developed color or the length of the bed that changes to the developed color is a measurement of the gas being analyzed. Conventionally the support materials are porous materials, such as silica gel and pumice, that absorb the reagent or non-porous supports, such as micro-fine rough glass beads or plastic chips, in which case the reagent adheres to the surface.

Porous support substance must undergo careful and extensive purification in order to remove impurities which may, even in trace amounts, exert a catalytic effect on a colorimetric reaction. Furthermore, the adsorption characteristics of porous reagent supports is dependent on pretreatment, which frequently makes uniform calibration difficult. Also, it is difficult to remove adsorbed water from such supports and small amounts of water can greatly reduce the storage stability of the indicator. Nonporous reagents must be surface treated, e.g., polystyrene chips must be surface rinsed with a solvent, or coated with an inert material that will bind the reagent to the surface. In addition, in all such prior art carriers, it is extremely difficult, if not impossible, to obtain defined and reproducible reaction surfaces.

In the indicator of this invention, the colorimetric reagent is carried on a granular support material consisting of inorganic or organic crystals of definite crystalline form. Suitable crystals are inert to the particular colorimetric reagent used, and must not sublime, i.e., they have substantially no vapor pressure at ambient temperature.

The use of crystalline support materials has many advantages. High purity crystalline materials are readily available or may be easily prepared by conventional methods, such as, for example, recrystallization from solutions. Crystals can be obtained, e.g., by recrystallization, having a uniform shape and definite surfaces. The most important advantage of crystal support materials is that uniform quality, in respect to purity, size, shape, porosity, and chemical qualities, e.g., pH value, can always be achieved, resulting in increased reliability and uniformity of the indicator. Finally the crystals are transparent or translucent, so reagent in the center of the bed of indicator can contribute to the observable coloration.

The indicator of this invention is simply prepared by mixing the crystalline support material with a solution of colorimetric reagent in a volatile solvent and removing the solvent by heating or, preferably, by vacuum drying. The crystals selected for use as a support for any particular reagent must be inert to and insoluble in the colorimetric reagent, and/or its solvent in order to assure that the reagent is applied only to the well-defined surface of the crystals. For proper analysis, the crystals also must be inert to and insoluble in the gas to be tested. Preferably, crystals of uniform size are used so that the support has a clearly defined surface upon which the reagent can be applied in reproducible amounts and coverage, thereby increasing the precision of the indicator in quantitive analyses. Preferably, the crystals are colorless.

Any non-sublimable crystals may be used in the practice of this invention, although it is preferred to use materials that may be recrystallized from aqueous solution. No surface treatment of the crystals is required, and any water of crystallization is firmly bound in the crystal to the extent that it does not adversely affect the colorimetric reagent. Generally, it is preferred to use inorganic crystals, e.g., alkali metal halides or sulfates, as supports for organic colorimetric reagents. The support can consist advantageously of mixed crystals, such as sodium-potassium chloride mixed crystals, alum and the like. These mixed crystals, which can be readily prepared, are distinguished by their excellent crystalline form and the crystalline form can be influenced by variations of the composition of the solution from which they are crystallized so that crystals of exceptional uniformity can be obtained.

Illustrative of this invention, 100 g. of sodium chloride crystals having a granule size of 0.3 to 0.5 mm. is mixed with a solution of 0.2 g. diethanolamine and 0.01 g. thymol blue in 6 ml. of chloroform. After thorough mixing, the chloroform is removed by vacuum drying. The resultant blue crystals are colored red by carbon dioxide.

In another example, 100 g. of potassium alum with a granule size of 0.3 to 0.5 mm. is mixed with a solution of 10 mg. tetraphenylbenzidine in 5 ml. of chloroform and the chloroform is then removed by vacuum drying. The resultant colorless crystals are turned blue by nitrogen oxides.

It will be recognized by those skilled in the art that any of the colorimetric reagents heretofore carried by granular supports can be used to advantage in the indicators of this invention.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:
1. A colorimetric indicator for gas analysis comprising a color changing reagent carried by a granular support, said support consisting of inorganic crystals crystallized from aqueous solution, said crystals being of uniform size, shape, crystalline form, porosity, chemical composition and purity, and being inert to said reagent and having substantially no vapor pressure at amibent temperature.
2. An indicator according to claim 1 in which the crystals are alum.
3. An indicator according to claim 1 in which the crystals are mixed crystals of sodium chloride-potassium chloride.
4. An indicator according to claim 1 in which the crystals are alkali metal halides.

5. An indicator according to claim 1 in which the crystals are alkali metal sulfates.

6. A method of preparing a colorimetric indicator comprising the steps of crystallizing from aqueous solution inorganic crystals of uniform size, shape, crystalline form, porosity, chemical composition and purity, mixing said crystals with a solution of a color changing reagent in a volatile solvent inert to said crystals, and removing said solvent by drying, said crystals being inert to said reagent and having substantially no vapor pressure at ambient temperatures.

References Cited

UNITED STATES PATENTS 2,174,349  9/1939  Littlefield _____ 23—232

JOSEPH SCOVRONEK, Primary Examiner

ELLIOTT A. KATZ, Assistant Examiner

U.S. Cl. X.R.

23—254